Inventors:
Vladimir J. Jandasek
and Eugene E. Leitner

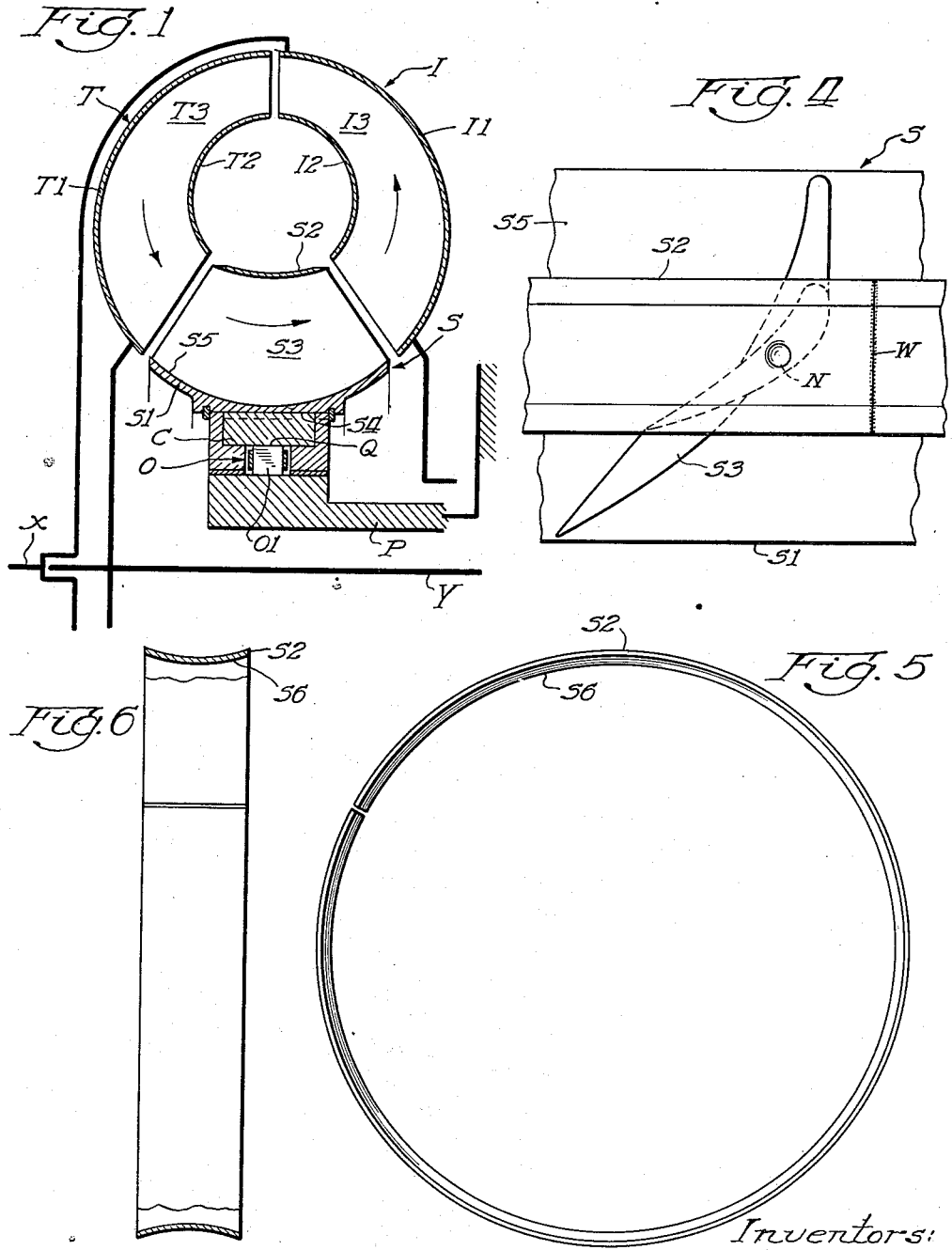

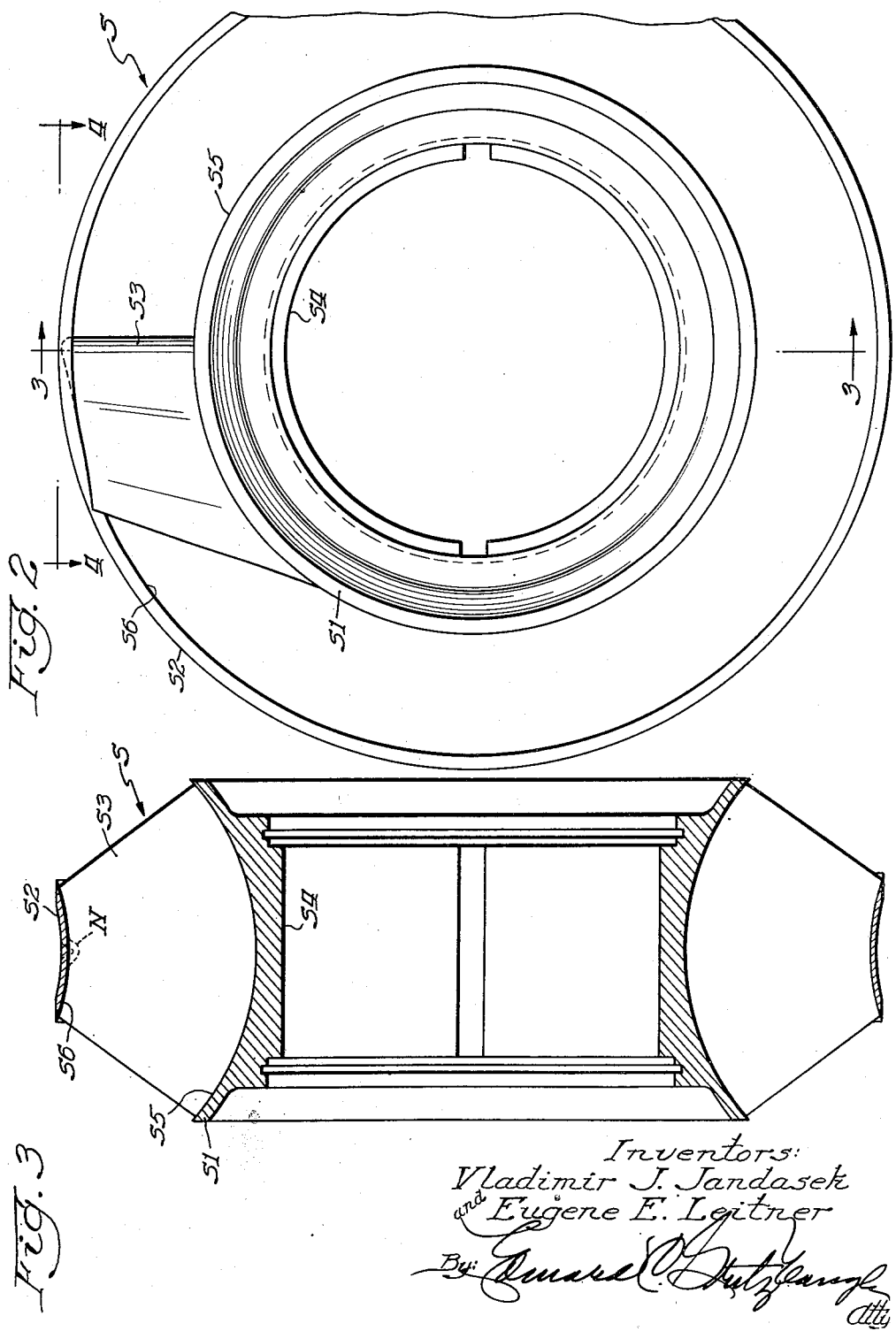

United States Patent Office 2,696,171
Patented Dec. 7, 1954

2,696,171

HYDRODYNAMIC COUPLING

Vladimir J. Jandasek, Detroit, and Eugene E. Leitner, Grosse Pointe Woods, Mich., assignors to Borg-Warner Corporation, Chicago, Ill., a corporation of Illinois Application June 21, 1950, Serial No. 169,443

2 Claims. (Cl. 103—115)

The present invention relates to hydrodynamic coupling devices and, more particularly, hydrodynamic coupling devices of the type employing the kinetic energy of a fluid to transmit or convert torque between driving and driven shafts. A hydrodynamic coupling device of the torque converting type usually comprises three or more vaned elements including an impeller or driving element, a turbine or driven element, and a reaction element or stator acting as a fulcrum for effecting torque conversion; while a hydrodynamic coupling device of the type employing only two vaned elements, an impeller and turbine, can transmit torque but is incapable of converting torque.

In the fabrication of hydrodynamic couplings of the types described, each of the various vaned elements of the coupling devices consists of a plurality of vanes, and also an outer annular supporting member and core ring or shroud of different diameters and having confronting curved surfaces which are connected together by the vanes, the vanes being curved in a torque converting coupling device and being substantially flat in a non-torque converting coupling device, for providing fluid passages in the supporting member and core ring. One conventional method of fabricating vaned elements is by a casting operation in which the component parts of the vaned elements are cast as a unit from aluminum. It is difficult to provide a vaned element in a single casting operation due to the interference of the core ring with the removal of the die or mold part forming the curved surfaces of the supporting member, and the core ring, as well as the vanes, and this is particularly true in the case of torque converting hydrodynamic coupling devices where the curvature of the vanes is critical in controlling the desired fluid flow through the vaned element.

An object of the present invention is to provide fabricated vaned elements for hydrodynamic coupling devices of the type described in which a vaned element is formed by casting the outer supporting member and the vanes as a unit and thereafter securing a core ring or shroud to the vanes.

Another object of the invention is to provide a method of making a vaned element for a hydrodynamic coupling device in which the vaned element may be readily and economically manufactured.

The present invention contemplates the formation of a hydrodynamic coupling vaned element by casting the supporting member and vanes as a unit and thereafter securing a rolled, or otherwise formed, band to the blades to provide a core ring or shroud. Construction of the vaned element as described is advantageous, due to the employment of a die-casting process with its attendant low costs and utility in permitting the most intricate parts of the vaned element (namely, the supporting member and vanes) to be accomplished in a simple manner, and thereafter the shroud or the core ring may be connected expeditiously and economically to the blades of the casting.

Other advantages and objects of the invention will become apparent from the following description of certain preferred embodiments and methods for making the same illustrated with reference to the accompanying drawings, wherein:

Fig. 1 is a diagrammatic cross-sectional view of a hydrodynamic torque converter coupling device;
Fig. 2 is a side elevational view of the reaction member or stator of the hydrodynamic coupling device to illustrate one embodiment of the invention;
Fig. 3 is a sectional view taken on line 3—3 of Fig. 2;
Fig. 4 is a fragmentary top view of a portion of the stator shown in Fig. 2 and looking in the direction of the arrows 4—4;
Fig. 5 is a side view of the annulus or band forming the shroud or core ring of the stator shown in Fig. 2;
Fig. 6 is an edge view of the core ring band shown in Fig. 5;
Figs. 7 and 8 are fragmentary views illustrating another manner of connecting the shroud band to the vanes of a stator, Fig. 7 being a side elevation and Fig. 8 being an edge view looking in the direction of 8—8 of Fig. 7; and
Figs. 9 and 10 are fragmentary views illustrating still another manner of connecting the shroud band to the vanes of a stator, Fig. 9 being a side elevation and Fig. 10 being a top view.

Like characters of reference designate like parts in the several views.

Referring now to the drawings and, more particularly, Fig. 1 thereof, there is illustrated a hydrodynamic coupling device of the torque converting type comprising a plurality of vaned elements including a driving element or impeller I and a driven element or turbine T, and a vaned element or stator or reaction member S. These elements define a closed fluid chamber in which fluid is circulated as indicated by the arrows, the impeller element connected to and functioning to receive energy from a power or engine-driven shaft, designated at X, and to impart energy to a body of fluid in the torque converter, the driven or runner element receiving the energy from the fluid and transmitting torque to the driven shaft Y, connected thereto, and the stator element being held from rotation by a one-way clutch of the sprag type, designated at O, and functioning as a reaction element to change the direction of the flow of the fluid so that the coupling functions to multiply the torque and to transmit the multiplied torque via the turbine to the driven shaft Y. Each of these vaned elements is provided with a plurality of curved vanes defining passages for controlling the flow of the liquid, in a manner well known in the art.

The hydrodynamic torque converter shown in Fig. 1 has its vaned elements formed with a supporting member (I1, T1, and S1), an inner core ring (I2, T2, and S2), and a plurality of vanes or blades (I3, T3, and S3) of airfoil shape extending between and connected to the core ring and supporting member of the particular vaned element. It is contemplated that the supporting member and blades of each of the vaned elements be formed as a casting and that the core ring or shroud be a rolled or formed metallic band secured to the inner ends of the vanes. For purposes of describing the invention, the structure and fabrication of the stator element S will be described, as it is believed that the description thereof will also suffice to comparably illustrate the structure and fabrication of the impeller and turbine elements.

Referring to Figs. 2, 3, 4, 5, and 6, the stator or reaction member S is there shown in detail, and its parts comprise the annular or cylindrical supporting member S1 having a cylindrical inner surface S4 keyed to a collar C forming an outer race of a one-way brake O and having engagement at Q with the sprags O1 of the one-way brake O, which sprags are mounted on a stationary part P, the sprags functioning in a well-known manner to permit rotation of the stator S in one direction and to prevent rotation of the stator S in the opposite direction. The member S1 has a surface S5 which is concavely curved between opposite edges thereof as shown in Fig. 3 and extending substantially radially outwardly of the surface S5 is a plurality of the radially spaced vanes S3, one of these vanes being shown in Fig. 4 and also Fig. 2, wherein it will be seen that the vane is warped helix-wise to provide a curvature effective as a fulcrum for the fluid flowing through the torque converter to effect torque multiplication.

The present invention contemplates that the supporting member of the stator S and the vanes S3 be die-cast in one piece of any suitable metal, preferably aluminum or an aluminum base alloy. It will be apparent that the conformation of the supporting member S1 and the vanes S3 in view of the their curvatures is the most intricate part of the fabrication of the stator, but it has been found this structure can be readily cast as a unit by a die-casting operation. As is well known in the art, die casting is a method of producing finished castings by forcing metal into a suitable mold which is arranged to open after the metal has solidified so that the casting can be removed. The die-casting process makes it possible to secure accuracy and uniformity in castings, and machining costs are either eliminated altogether or greatly reduced. The greatest advantage of the die-casting process is due to the fact that the parts are accurately and usually completely finished when taken from the dies. It has been determined that, when the dies are properly made, castings may be accurate within 0.001 inch or even less and a limit of 0.002 and 0.003 inch can be maintained easily on many classes of work. Die casting, owing to numerous developments, also permits many shapes to be formed which formerly were believed too intricate for die casting. Accordingly, the supporting member and vanes can be die cast to provide a finished casting by forcing a molten metal into a suitable mold which is then opened after the metal has solidified so that the casting can be removed. In the event die casting methods were utilized to cast the vanes, supporting member and shroud of the stator as a unit, disadvantages arise in the employment of two or more molds with consequent difficult alignment of the molds to produce the geometrically exacting and required vane curvatures and also there is considerable increase in the cost of the die cast molds required to make the stator as an aluminum casting. However, by utilization of a single mold for casting the hub and the vanes of the stator, this die-casting operation is, comparatively, readily and simply accomplished in an economical manner for high quantity low cost production, and the stator may be readily completed by securing a preformed metallic cylindrical band S2 of preformed steel to the edges of the vanes to serve as a shroud or core ring.

In the preferred embodiment of the invention herein described and shown, it is contemplated the core ring or shroud S2 be initially formed as a flexible elongate strip or member preformed to define a cross-sectional curvature as shown in Fig. 3 and then bent to assume an annular or cylindrical split band so that the surface S6 will surround and engage the free edges of the vanes, the preforming operation causing the surface S6 to be convexly curved to conform to and complement the concave curvature of each of the radially outer edges of the vanes as shown in Fig. 3. It may be noted that the radially inner edge of each of the vanes is convexly curved, while the surface S5 is concavely curved in the casting operation, as shown in Fig. 3. The split band thus entirely surrounds radially outer edges of the vanes with the side edges of the band terminating at the straight side edges of the vanes. The face ends of the split band may then be maintained in engagement by a clamp, or other suitable positioning device, and are connected by any suitable means, as shown in Fig. 4, wherein the ends of the split ring are placed in abutment and then permanently connected by a suitable weld W, the ends of the split band being preferably connected to each other in a radial plane between two of the vanes. It will be clearly apparent that the engagement of the band with the contiguous ends of the vanes, when coupled with the complementary convex and concave curvatures of the engaged surfaces thereof, will maintain the band against movement relative to the vanes and axially of the supporting member S1. To prevent rotation of the band relative to the vanes, each of alternate vanes may be provided with a notch N in its radial outer edge by a countersinking operation and thereafter the shroud may be staked to the vane as clearly shown in Figs. 3 and 4. The band or shroud of the stator is in circumferential alignment with the core rings 12 and T2 of the impeller and turbine so that there will be an unbroken continuity of flow of the liquid in the converter along the surfaces of the core rings partly defining the fluid passages in the torque converter.

Figure 8:
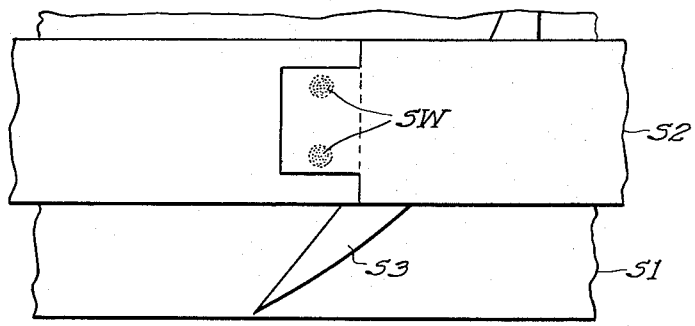
Figs. 7 and 8 illustrate another manner of connecting the ends of the split band together by means of a lap joint, the overlapping ends of the band being connected together by two spot welds SW as indicated in said figures.
Figure 7:
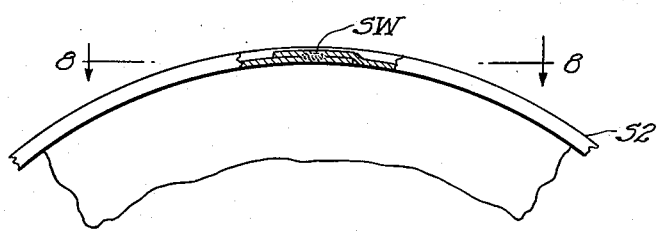
Figure 10:
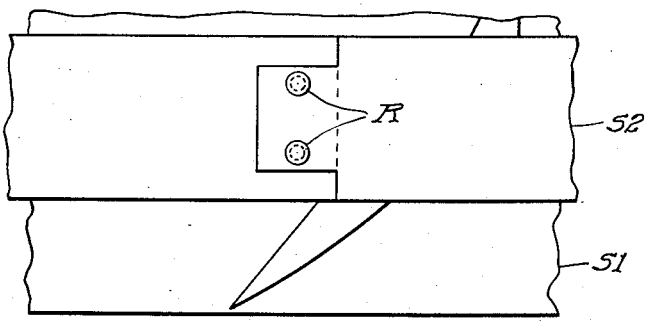
Figure 9:
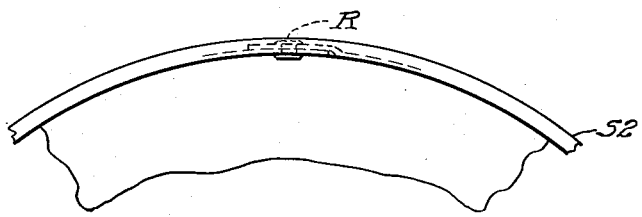
Fig. 9 illustrates another manner of connecting the two ends of the split band together by the use of rivets R.

It is to be understood that, although the embodiments of the invention illustrated are in connection with a vaned stator element of a hydrodynamic coupling device, the invention is not to be limited to a stator element to the exclusion of driving or impeller elements and turbine or driven elements of a hydrodynamic coupling, unless the claims are so limited.

We claim:

1. In a vaned element of a hydrodynamic coupling device, the combination of an integral vaned assembly of cast metal including an annular hub having vanes projecting outwardly therefrom and disposed circumferentially of said hub, said hub having an outer concavely curved surface extending between axially spaced edges thereof to control the flow of fluid along said surface, said vanes being of streamline shape to provide curved faces effective to change the direction of flow through the vaned element, each vane having a relatively blunt leading edge at one end thereof and a narrow trailing edge at the other end thereof, with the base of the vane being of greater surface area than the top of the vane and having a curvature complemental to the curvature of said hub surface, said edges of said vanes converging radially outwardly of said hub and terminating in a surface forming the top of said vane and concavely curved between said edges; and a flexible steel ring surrounding said vaned assembly and engaging the concave surfaces of said vanes defining the tops of said vanes and having a convex surface engaging said latter surfaces with a wedging action of said vanes and ring to retain said ring engaged with said vanes, said convex surface of said ring controlling the flow of the circulating fluid along said last-mentioned surface.

2. In a vaned element of a hydrodynamic coupling device as defined in claim 1 in which the cast metal of the integral vaned assembly is aluminum.

References Cited in the file of this patent

UNITED STATES PATENTS

| Number | Name | Date |
| --- | --- | --- |
| 1,433,478 | Rogatchoff | Oct. 24, 1922 |
| 1,947,462 | Doorbar | Feb. 20, 1934 |
| 2,212,901 | Schneider | Aug. 27, 1940 |
| 2,247,813 | Huitson | July 1, 1941 |
| 2,284,729 | Dusevoir | June 2, 1942 |
| 2,304,721 | Werther | Dec. 8, 1942 |
| 2,438,867 | Rockwell | Mar. 30, 1948 |
| 2,452,855 | Kempf et al. | Nov. 2, 1948 |
| 2,454,580 | Thielemann | Nov. 23, 1948 |
| 2,461,217 | Lapsley | Feb. 8, 1949 |
| 2,466,266 | Orr | Apr. 5, 1949 |
| 2,466,356 | Becker | Apr. 5, 1949 |
| 2,473,185 | Weiss | June 14, 1949 |
| 2,542,913 | Ensign | Feb. 20, 1951 |
| 2,613,609 | Buchi | Oct. 14, 1952 |
| 2,652,191 | Buchi | Sept. 15, 1953 |